United States Patent
Azulai et al.

(10) Patent No.: US 7,904,529 B2
(45) Date of Patent: Mar. 8, 2011

(54) METHOD AND SYSTEM FOR TRANSMITTING AND RECORDING SYNCHRONIZED DATA STREAMS

(75) Inventors: Ophir Azulai, Kiriat Tivon (IL); Martin G. Kienzle, Briarcliff Manor, NY (US); Gayathri Shaikh, Shrub Oak, NY (US); Durga Sai Phaneendar Vemuru, Jersey City, NJ (US); Peter H. Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 11/678,421

(22) Filed: Feb. 23, 2007

(65) Prior Publication Data

US 2008/0204357 A1   Aug. 28, 2008

(51) Int. Cl.
   *G06F 15/16*   (2006.01)
(52) U.S. Cl. .......................................... 709/217; 709/204
(58) Field of Classification Search .................. None
   See application file for complete search history.

(56) References Cited

U.S. PATENT DOCUMENTS

| | | | |
|---|---|---|---|
| 7,233,979 B2 * | 6/2007 | Dickerman et al. | 709/218 |
| 2005/0021805 A1 | 1/2005 | De Petris et al. | |
| 2007/0168447 A1 * | 7/2007 | Chen et al. | 709/207 |
| 2008/0133535 A1 * | 6/2008 | Fischer et al. | 707/10 |

OTHER PUBLICATIONS

"Macromedia Breeze by Adobe", 1 page, retrieved Jan. 26, 2007. http://www.adobe.com/products/breeze/index.html.
"Microsoft Office live Meeting", 1 page, retrieved Jan. 24, 2007 http://www.microsoft.com/uc/livemeeting/default.mspx.
Camstasia Studio from TechSmith, pp. 1-2, retrieved Jan. 24, 2007 http:///www.techsmith.com/camstasia.asp?CMP=KgoogleCStm.
"Ironclad Instant Messaging", webex, 1 page, retrieved Jan. 24, 2007 http://www.webex.com.
"Simply Compelling Communications", Cisco Digital Media System, pp. 1-2, retrieved Jan. 24, 2007 http://www.cisco.com/en/US/netsol/ns620/networking_solutions_package.html.
"Integrated Voice, Video- and Web Conferencing", Cisco Unified Meeting Place, pp. 1-2, retrieved Jan. 25, 2007 http://www.cisco.com/en/US/products/sw/ps5664/ps5669/index.html
AVISTAR, 1 page, retrieved Jan. 25, 2007 http://www.avistar.com/technology.cfm.
TANDBERG, 1 page, retrieved Jan. 24, 2007 http://www.tandberg.net/products/index.jsp.
POLYCOM, 1 page, retrieved Jan. 24, 2007 http://www.polycom.com/products_services/0,,pw-35,00.html.
Muller et al., "The "Authoring on the Fly" system for automated recording and replay of (tele)presentations", Multimedia Systems, ACM, New York, NY, vol. 8, Oct. 2000, pp. 158-176.

* cited by examiner

*Primary Examiner* — John B. Walsh
(74) *Attorney, Agent, or Firm* — Yee & Associates, P.C.; Anne V. Dougherty

(57) ABSTRACT

System for transmitting one or more presentation data streams from a presentation workstation. In response to receiving an input to open a presentation application, operating parameters are obtained for a presentation to provide presentation operating parameters for the presentation. One or more selected presentation data streams are captured based on the obtained presentation operating parameters. Then, the one or more captured presentation data streams are transmitted based on the obtained presentation operating parameters directly from the presentation workstation to one or more viewing devices via a network without utilizing an intervening server.

34 Claims, 5 Drawing Sheets

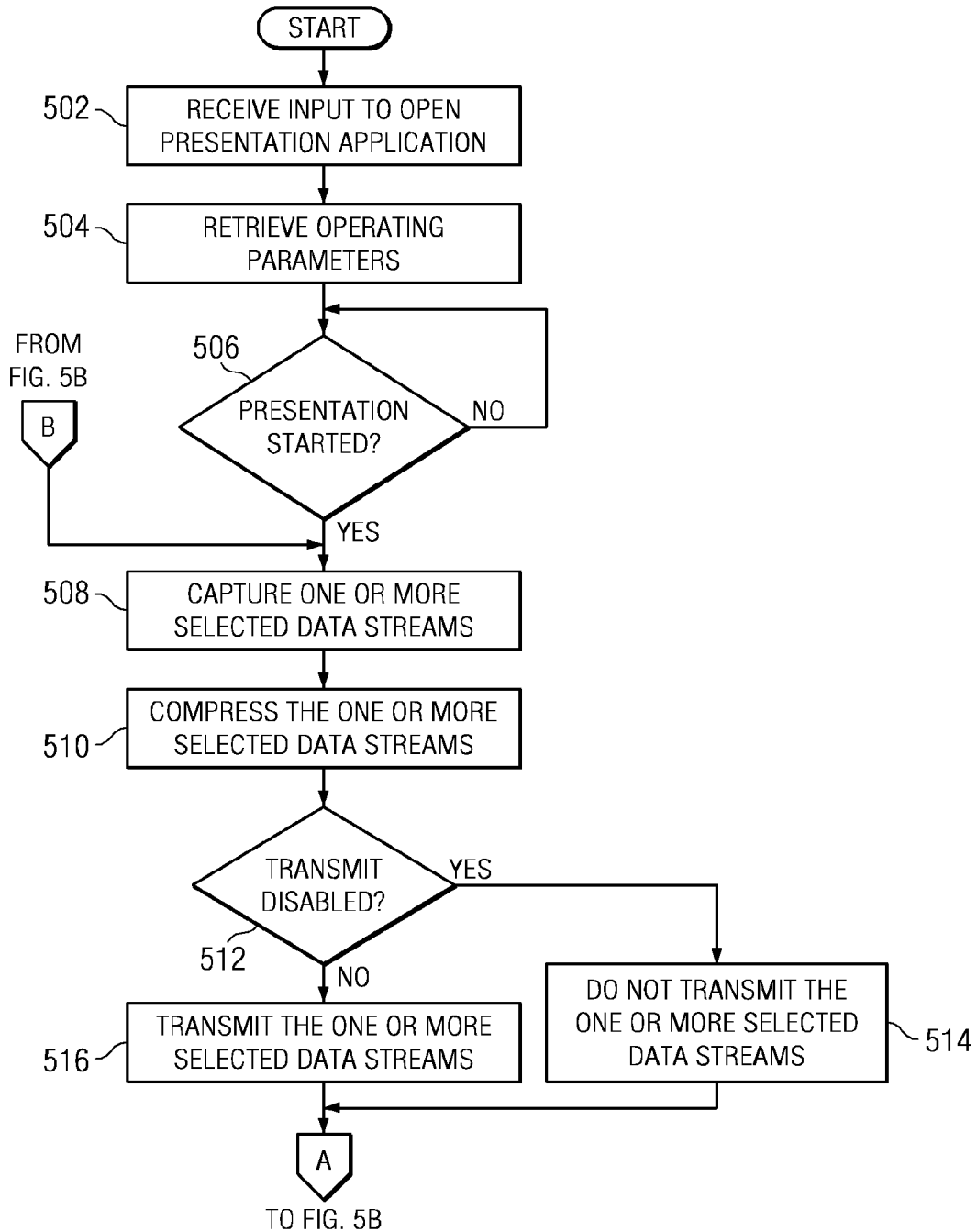

METHOD AND SYSTEM FOR TRANSMITTING AND RECORDING SYNCHRONIZED DATA STREAMS

BACKGROUND OF THE INVENTION

1. Field of the Invention

The present invention relates generally to an improved data processing system. More specifically, the present invention is directed to a computer implemented method, system, and computer usable program code for transmitting and/or recording synchronized streams of live presentation data.

2. Description of the Related Art

In today's business environment, it is not uncommon for all participants not to be physically present at a business meeting. Consequently, many businesses utilize a teleconference system as a means to include remote participants. However, these remote participants may have difficulty following the meeting because of a lack of presentation material to view.

In order to share the presentation material with the remote participants, businesses typically send the information to the remote participants via mail or e-mail prior to the teleconference. In many cases, though, the discussion during the teleconference may require participants to view material that was not previously anticipated. As a result, this unanticipated material is not available for viewing by the remote participants.

In addition, if presentation material is electronically sent and stored for teleconference participants to view during the meeting, each participant is required to navigate on their own to access the presentation material. This navigation process by the participants may cause confusion and waste valuable time. Also, this navigation process may require that the presenter spend time guiding the participants to the relevant material, which also wastes time. Further, it is almost impossible for a teleconference system to produce a complete record of the meeting's discussion and materials presented.

Another known method to share information during business meetings is a shared-display session, which is sometimes called a Web meeting. In a shared-display session, a personal computer (PC) display of one of the participants or an application display window is shared across the network with the other participants. This shared-display session requires a network server and pre-planning. In addition, the shared-display session often requires installation of special software on the presenter's system, as well as on the viewers' systems. Consequently, a business using this shared-display session technology will increase operating costs to maintain the network servers and manage additional infrastructure and installed software. Moreover, a set-up action is often required for all participants in the shared-display session, which may consume a substantial amount of time at the beginning of the meeting. Furthermore, shared-display technology typically cannot handle animation.

Alternatively, a business may use a video conference system to conduct a meeting when all of the participants are not able to be physically present. However, video conference systems also require a network server, or some other type of control unit, to manage the connections between end-points. In addition, these video conference systems require either special software to be installed on the viewing systems, in the case of desk-top video conferencing, or completely specialized, single-function viewing systems. Also, video conference systems typically have little support for sharing material other than the audio and video of the participants. Further, video conference systems do not support recording of the conference.

Some advanced systems combine display-sharing and video conferencing features. While this combination may improve the amount and quality of information shared at meetings, it also increases the cost and complexity of these advanced systems. Moreover, these advanced systems require network servers, software installation, and pre-meeting configuration and set-up. Furthermore, these advanced systems do not share animated presentations or recorded video presentations. These advanced systems only share the video of the respective participants and transmit where the respective participants choose to direct their video cameras.

Another problem with the above-mentioned systems is that these systems cannot provide a complete record of the meeting for those people who should have participated but did not because of other commitments. While some existing systems may record parts of a business meeting presentation, none of the existing systems record all aspects of the meeting. In addition, existing systems use servers to record whatever parts of the meetings that may be captured. This results in additional investment and operating costs to businesses.

Therefore, it would be beneficial to have an improved computer implemented method, system, and computer usable program code for transmitting and/or recording synchronized streams of live presentation data without utilizing a server.

SUMMARY OF THE INVENTION

Illustrative embodiments provide a computer implemented method, system, and computer usable program code for transmitting one or more presentation data streams from a presentation workstation. In response to receiving an input to open a presentation application, operating parameters are obtained for a presentation to provide presentation operating parameters for the presentation. One or more selected presentation data streams are captured based on the obtained presentation operating parameters. Then, the one or more captured presentation data streams are transmitted based on the obtained presentation operating parameters directly from the presentation workstation to one or more viewing devices via a network without utilizing an intervening server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A and FIG. 5B is a flowchart illustrating an exemplary process for transmitting and recording synchronized streams of live presentation data by a presentation workstation in accordance with an illustrative embodiment.

DETAILED DESCRIPTION OF THE PREFERRED EMBODIMENT

Figure 1:
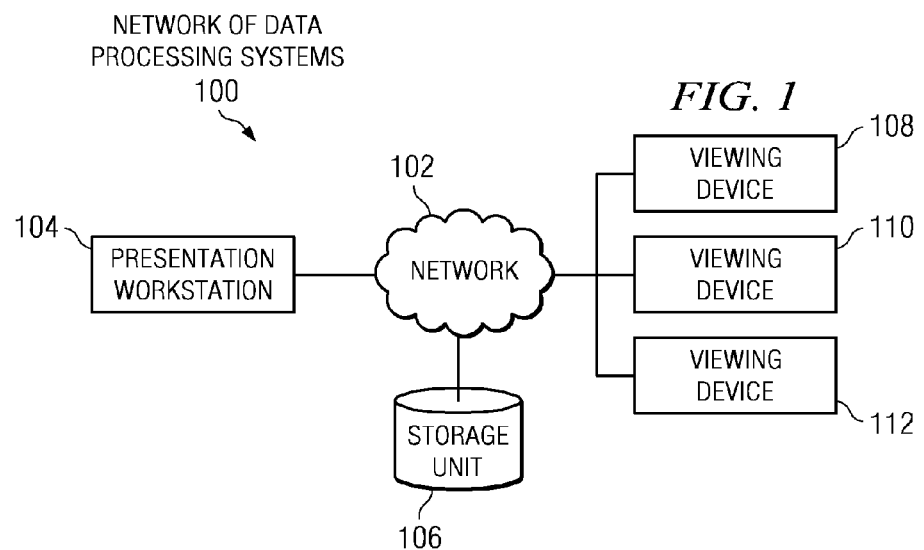
FIG. 1 is a pictorial representation of a network of data processing systems in which illustrative embodiments may be implemented.
Figure 2:
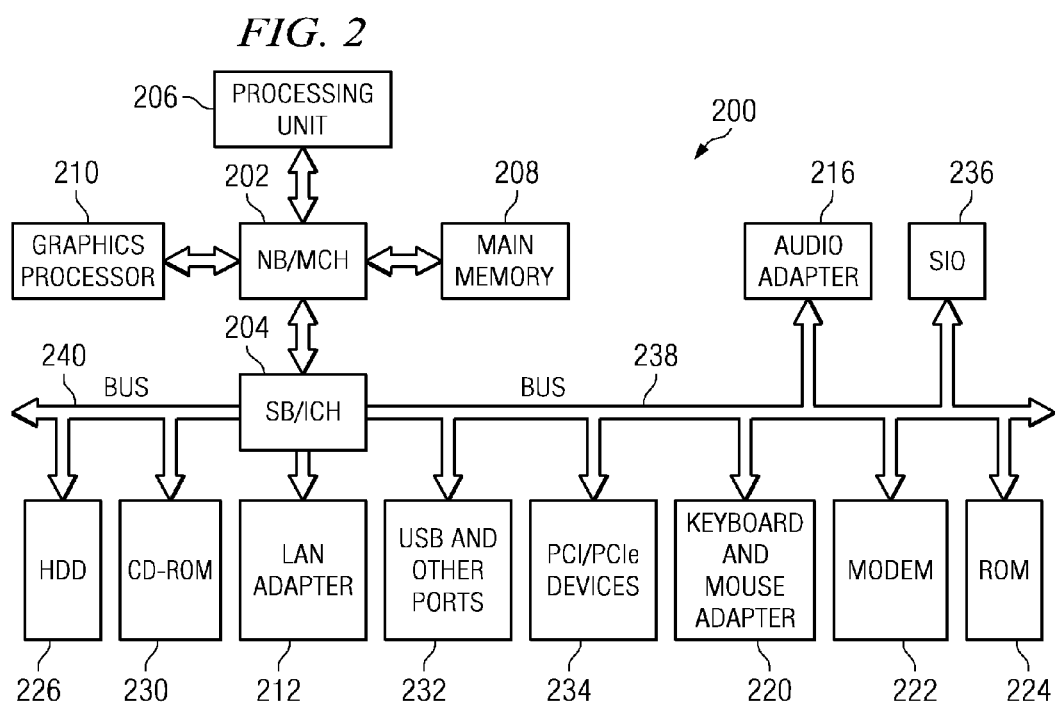
FIG. 2 is a block diagram of a data processing system is shown in which illustrative embodiments may be implemented.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which illustrative embodiments may be implemented. Of course, network data processing system 100 may be implemented using a number of different types of networks, such as, for example, an intranet, a local area network (LAN), or a wide area network (WAN). Network data processing system 100 contains network 102, which is the medium used to provide communications links between various computers and other devices coupled together within network data processing system 100. Network 102 may include connections, such as wire, wireless communication links, or fiber optic cables.

In the depicted example, presentation workstation 104, along with storage unit 106, connect to network 102. Presentation workstation 104 is a workstation that a presenter uses to produce a presentation. A presenter is a person that conducts the presentation. Viewing devices 108, 110, and 112 also connect to network 102. A viewing device is a device that a viewer uses to view a transmission or a recording of a presentation. A viewer is a person that views the transmission or the recording of the presentation.

Presentation workstation 104 and viewing devices 108, 110, and 112 may, for example, be personal computers or network computers. In the depicted example, presentation workstation 104 provides one or more presentation data streams, such as, for example, video, audio, image, and/or text, of a presentation to viewing devices 108, 110, and 112. A presentation data stream is a stream of data produced by a presentation workstation that is associated with the production of a presentation. A presentation data stream may contain any combination of several components, such as one or more video streams, one or more audio streams, one or more image streams, one or more textual streams, and one or more navigation tag streams. It should be noted that presentation workstation 104 provides these one or more presentation data streams to viewing devices 108, 110, and 112 via network 102 without utilizing a server. However, network data processing system 100 may include servers, clients, and other devices not shown.

Storage unit 106 is a remote non-volatile storage device. Presentation workstation 104 may use storage unit 106 to, for example, store presentation files. However, it should be noted that presentation workstation 104 may store presentation files in a local storage device in addition to, or instead of, storage unit 106. A presentation file is a file that includes recordings of the one or more presentation data streams and other user-generated data of a previously recorded presentation to provide a complete record of the presentation.

The other user-generated data stored in storage unit 106 may, for example, include information, such as title of the presentation, name of presenter, date and time of the presentation, list of participants, summary of the presentation, list of presentation materials, and a navigation tab index for locating specific segments of the presentation and/or specific presentation materials. In addition, storage unit 106 may contain any data necessary for processes of illustrative embodiments to transmit and record the one or more synchronized streams of presentation data. A user utilizing viewing device 108, 110, or 112 or presentation workstation 104 may access storage unit 106 at a later time to view one or more stored presentation files. However, it should be noted that storage unit 106 is an optional component of network of data processing systems 100 and that illustrative embodiments are perfectly operable without such a storage unit.

With reference now to FIG. 2, a block diagram of a data processing system is shown in which illustrative embodiments may be implemented. Data processing system 200 is an example of a computer, such as presentation workstation 104 or viewing device 108 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and MCH 202. Processing unit 206 may contain one or more processors and even may be implemented using one or more heterogeneous processor systems. Graphics processor 210 may be coupled to north bridge and MCH 202 through an accelerated graphics port (AGP), for example.

In the depicted example, local area network (LAN) adapter 212 is coupled to south bridge and ICH 204 and audio adapter 216, keyboard and mouse adapter 220, modem 222, read only memory (ROM) 224, universal serial bus (USB) ports and other communications ports 232, and PCI/PCIe devices 234 are coupled to south bridge and ICH 204 through bus 238, and hard disk drive (HDD) 226 and CD-ROM drive 230 are coupled to south bridge and ICH 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). HDD 226 and CD-ROM drive 230 may use, for example, an integrated drive electronics (IDE) or serial advanced technology attachment (SATA) interface. A super I/O (SIO) device 236 may be coupled to south bridge and ICH 204.

An operating system runs on processing unit 206 and coordinates and provides control of various components within data processing system 200 in FIG. 2. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as HDD 226, and may be loaded into main memory 208 for execution by processing unit 206. The processes of the illustrative embodiments may be performed by processing unit 206 using computer implemented instructions, which may be located in a memory such as, for example, main memory 208, ROM 224, or in one or more peripheral devices.

The hardware in FIGS. 1-2 may vary depending on the implementation. Other internal hardware or peripheral devices, such as flash memory, equivalent non-volatile memory, or optical disk drives and the like, as well as other types of network adapters, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and MCH 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Illustrative embodiments provide a computer implemented method, system, and computer usable program code for transmitting and/or recording one or more synchronized streams of live presentation data within a network without utilizing a server. In response to receiving an input to open a presentation application within a presentation workstation, the presentation application obtains operating parameters for a presentation. The obtained presentation operating parameters may be default operating parameters provided by the presentation application or user inputted operating parameters. The operating parameters define how the presentation application captures, compresses, transmits, and/or records the presentation. For example, the operating parameters define whether the presentation application transmits and/or records the presentation. However, it should be noted that the user, or presenter, at the presentation workstation may at any time during the presentation modify, add, or delete any operating parameter as desired. The user may make these modifications, additions, or deletions to the operating parameters by manual input utilizing, for example, a keyboard or mouse, or by voice command utilizing, for example, a microphone.

Based on the obtained operating parameters, the presentation application captures one or more selected presentation data streams. Then, the presentation application compresses the one or more captured presentation data streams. Afterward, the presentation application transmits the one or more compressed presentation data streams based on the obtained operating parameters directly to one or more viewing devices via a network without utilizing an intervening server. In addition, the presentation application records the one or more compressed presentation data streams based on the obtained operating parameters. Finally, the presentation application stores the one or more recorded presentation data streams in a presentation file within a storage device in the presentation workstation to provide a complete record of the presentation.

Illustrative embodiments use a PC based system that allows a user or presenter to transmit and/or record live presentation data streams of synchronized video, audio, image, and text to other users or viewers over a network, such as a company intranet or internet. Recorded presentation data streams may later be transmitted as a single presentation file to other users for disconnected viewing. The recorded presentation data streams may contain timing and navigation information, which may make it easier for viewers to find a particular spot in a presentation.

Illustrative embodiments are unique in their simplicity. The presentation workstation only requires a video camera, such as a web cam, a microphone, and a presentation application. Viewing devices only require a display, a speaker, and a player application.

The presentation application does not require the user to make an explicit selection for transmission of the presentation data. In other words, the presentation application transmits and/or records the presentation data or display content of the "current" window within the display device. The current window is the "top" or "uppermost" window within the display if more than one window is open. A user may select any open window within the display to be the current window simply by placing the window on top. If the selected display content in the current window is a dynamic animation or video, the dynamic animation or video is transmitted as a video presentation data stream. If the selected display content is a static image, the static image is transmitted as an image presentation data stream. Transmission of the image presentation data stream may occur manually by user input or automatically at pre-determined time intervals. The presentation workstation transmits the presentation data directly from the presentation workstation to the one or more viewing devices via the network without requiring an intervening server.

By not requiring an intervening server, illustrative embodiments may obviate any resource management requirements in the network, which reduces the need for capital investment and for explicit resource allocation. Also, the presentation application may record the presentation data on the presentation workstation, itself. Recording the presentation data on the presentation workstation gives the presenter or user full control of the recording process and does not require any server allocation or management for the recording process. Even though illustrative embodiments do not require an intervening server to perform the recording process, an alternative illustrative embodiment may utilize a server to record the presentation data streams.

The presentation workstation user may dynamically select components of the presentation data stream, such as audio, video, image, and text, at any time during the presentation for transmission. A video data stream is a video component of the presentation, an audio data stream is an audio component of the presentation, an image data stream is an image component of the presentation, and a text data stream is the textual component of a presentation. The presentation workstation user may at any time during the presentation manually select components of the presentation data stream to be recorded independently from the components to be transmitted. Also, the presentation workstation user may at any time during the presentation manually enable (turn on) or disable (turn off) transmission and/or recordation of the presentation data stream independently of each other. It should be appreciated by those of ordinary skill in the art that all presentation workstation user choices may be stored in a preference file so that the user only need start the presentation application on subsequent presentations.

Furthermore, the presentation application may automatically insert navigation tags during the capturing or recording process to improve later navigation of the recorded presentation data stream or presentation file. The presentation application may use the tags to, for example, mark time intervals or signal changes in audio, video, image, and/or textual content obtained through an analytic program. Alternatively, the presentation workstation user or presenter may insert the navigation tags by, for example, entering text using a keyboard into an appropriate user interface during the capturing or recording process. The presentation workstation user also may insert the navigation tags by, for example, speaking voice commands, such as, "tag," tag contents, and "end tag," into a microphone.

To connect to a live presentation, a user of a viewing device only needs to enter a single presentation address identifier, such as a uniform resource locator (URL), into, for example, a runtime execution environment, such as a Web browser, on the viewing device. The presentation address identifier identifies the location of the presentation workstation within the network so that viewing devices may connect with the presentation workstation to receive transmission of the one or more presentation data streams or stored presentation files. A viewing device does not require pre-installation of a player application, but the player application may be obtained by the runtime execution environment based on the presentation address identifier. The player application connects to the presentation workstation to receive the one or more live presentation data streams.

To view a recorded presentation data stream, or presentation file, the viewing device user must install the player application on the viewing device and receive the recorded presentation data stream, or presentation file, from the presentation workstation through any means available, such as file transfer protocol (FTP), Web download, or e-mail. The player application that displays the recorded presentation data stream on a viewing device may use the inserted navigation tags to allow the viewing device user to navigate or jump to a particular point in the presentation file without having to view the entire presentation.

Thus, the one-way nature of most presentations is reflected in the design of illustrative embodiments. Illustrative embodiments simplify operation and coordination between the presentation workstation and the one or more viewing devices by making possible a simple, server-less operation. Also, illustrative embodiments reduce to a minimum administrative set-up prior to the start of a presentation. This simple, server-less design meets the requirements of many presentation meetings that include remote participants. By using an illustrative embodiment, a presentation workstation user or presenter may at any time instantly determine what material to present and discuss in the meeting. Thus, illustrative embodiments allow for greater adaptability in presentation content during a meeting with remote participants that may not otherwise occur using other known systems. In addition, the simplicity of illustrative embodiments permit a second user on a second presentation workstation to be a presenter in the meeting by suspending the first presentation on the original presentation workstation and starting a second presentation from the second presentation workstation.

Figure 3:
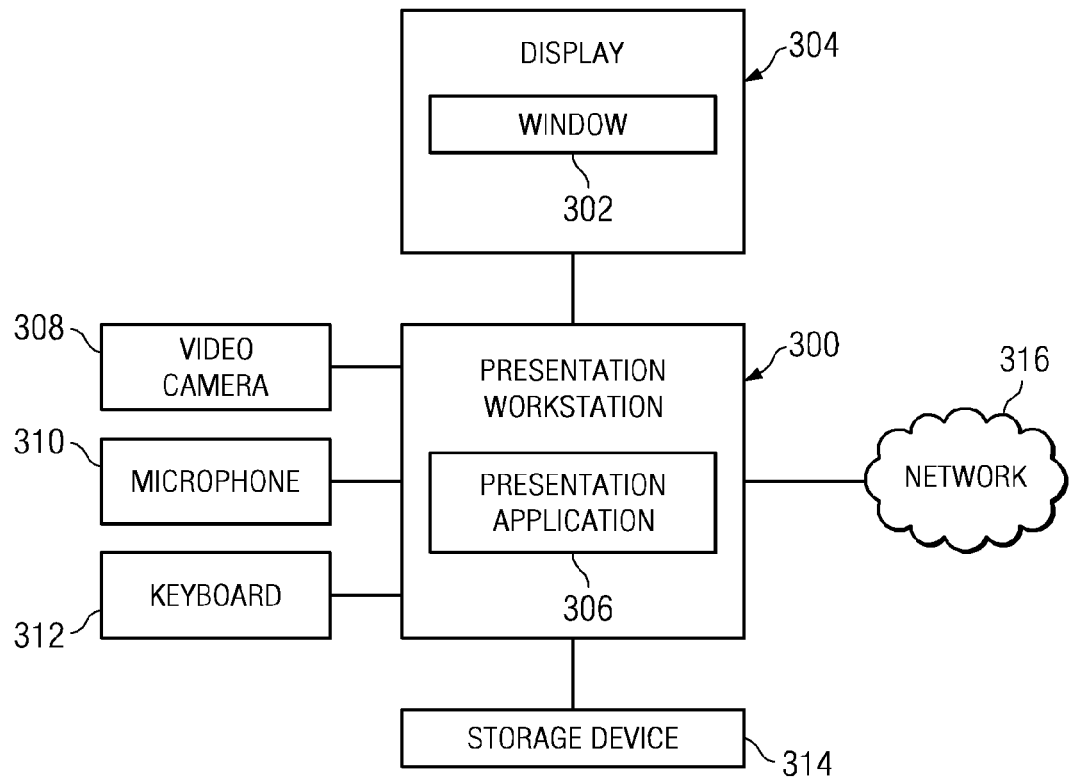
FIG. 3 is a block diagram of components of a presentation workstation in accordance with an illustrative embodiment.

With reference now to FIG. 3, a block diagram of components of a presentation workstation is depicted in accordance with an illustrative embodiment. Presentation workstation 300 may, for example, be presentation workstation 104 in FIG. 1. Presentation workstation 300 typically is a computer, such as data processing system 200 in FIG. 2, which is capable of executing various applications that the user may desire to utilize during a presentation. These various applications may, for example, be graphics applications, word processing applications, spreadsheet applications, Web browsing applications, and the like. The output of these various applications may appear in one or more windows within a display device that is connected to the presentation workstation, such as, for example, window 302 within display 304 that is connected to presentation workstation 300.

Presentation workstation 300 also includes presentation application 306. Presentation application 306 is an application that controls all processes associated with transmission and recordation of one or more presentation data streams. Presentation application 306 captures, compresses, records, and transmits the one or more presentation data streams and controls each of these operations.

Prior to starting presentation application 306 the user, or presenter, must first make sure that all required user input devices are connected to presentation workstation 300 and are enabled. In this particular exemplary illustration of FIG. 3, the user input devices that connect to presentation workstation 300 are video camera 308, which may represent a Web cam, microphone 310, which may represent any audio capture device, and keyboard 312, which may represent any text entry device. However, it should be noted that presentation workstation 300 may include more or fewer user input devices depending on the presentation data streams selections made by the user for a particular presentation.

After ensuring that all required user input devices are connected to presentation workstation 300 and are enabled, the user opens presentation application 306 on presentation workstation 300 by, for example, using a mouse to click on a presentation application 306 icon within display 304. Presentation application 306 stores default values for each of the parameters and operating modes of presentation application 306 to allow the user or presenter to simply start a presentation without having to enter values for all of the parameters and operating modes at each use. In other words, if the default operating parameters for presentation application 306 are appropriate for the presenter's specific use, the presenter may simply start the presentation immediately after opening presentation application 306. Consequently, it is expected that illustrative embodiments will require the user to only change a small number of operating parameters when necessary.

However, the presenter may change values for specific default parameters and operating modes as desired. For example, the user may change components of the presentation data stream from video and audio to only audio, from image to text, from only video to all components, or to any possible combination of presentation data stream components. In addition, the user may change the values of quality parameters for each presentation data stream, such as resolution of a video stream (e.g., frames per second and pixels) and data rate of a compressed video stream (e.g., kilobytes per second). Further, the user may select which presentation data stream components to transmit, if any, and select which presentation data stream components to record, if any.

Furthermore, the user may select: compression parameters for each presentation data stream component; image capture parameters, such as, for example, capture application display content in the current window on top or capture entire display content; and an image capture mode. The image capture mode may, for example, include: a manual image capture mode for user action; a periodic image capture mode with selection of a capture period; and a video image capture mode to render animation and videos that are part of the display.

Moreover, the user may select a transmission mode, such as, for example, a multicast transmission or a unicast transmission. The multicast transmission simultaneously transmits one data stream to multiple viewing devices. The unicast transmission transmits a separate data stream to each viewing device. For either a multicast transmission or a unicast transmission, each component of the presentation data stream may be transmitted as an individual stream or all streams may be combined to a single multiplexed stream.

Also, the user may select the storage location, such as storage device 314, for storing recorded presentation data streams or presentation files. Storage device 314 is a local non-volatile storage device and is connected to presentation workstation 300. Storage device 314 may, for example, be ROM 224, HDD 226, or CD-ROM 230 in FIG. 2. Alternatively, the user may select a remote storage location, such as storage unit 106 in FIG. 1, to store recorded presentation data streams or presentation files.

Subsequent to starting presentation application 306, presentation application 306 captures, compresses, transmits, and records each of the specific presentation data stream components. In the capture step, presentation application 306 acquires and captures from an input source, such as video camera 308, microphone 310, keyboard 312, or a display screen software, data for a particular presentation data stream, such as video, audio, text, or display image, respectively, and places the captured data into a standard format.

In the compression step, presentation application 306 compresses the captured data using standard compression algorithms, such as AAC for audio, MPEG-4 for video, and JPEG for image. The above-named compression algorithms are for exemplary purposes only and not meant as limitations on illustrative embodiments. Illustrative embodiments may use any appropriate compression algorithm. This compression step reduces storage space requirements for presentation files. In addition, the compression step also reduces transmission bandwidth requirements when transmitting the one or more presentation data streams over a network, such as network 316. Network 316 may, for example, be network 102 in FIG. 1. Presentation workstation 300 connects to network 316 to transmit the one or more presentation data streams to one or more viewing devices, such as viewing devices 108, 110, and 112 in FIG. 1.

In the transmission step, presentation application 306 transforms the compressed presentation data streams into a packet format according to network 316 protocol specifications. Of course, as noted previously above, the user or presenter selects which of the one or more presentation data streams, if any, that presentation application 306 is to transmit. After transforming each compressed presentation data stream into a packet format, presentation application 306 may combine and multiplex the packets from each of the presentation data streams into a single stream for transmission via network 316.

In the recordation step, presentation application 306 transforms the compressed presentation data streams, which the user selected for recordation and storage, into a storage format, if necessary. It should be noted that in some cases transformation of the compressed presentation data streams into a storage format is not necessary for storage. After transforming each compressed presentation data stream into a storage format, presentation application 306 combines and multiplexes the presentation data streams into a single stream for storage within a single file, such as, for example, a presentation file. The presenter may archive the presentation file, send the presentation file to users who should view it, or make the presentation file available to users by any other means, such as posting the presentation file on a Web page. Depending on the final storage format, presentation application 306 may require a reformatting step after the entire presentation has been recorded.

In addition, presentation application 306 may automatically insert navigation tags into the one or more presentation data streams to, for example, mark sections of the presentation, mark time intervals, or mark changes in presentation data stream content as determined by an on-line stream analysis program, for instance. Alternatively, a user or presenter may insert navigation tags into the one or more presentation data streams by entering text into an appropriate application window using keyboard 312 or by speaking an appropriate voice command into microphone 310. Presentation application 306 records these inserted navigation tags onto the storage device as part of the presentation file.

It should be noted that if at some point in time during the presentation the presenter decides to neither transmit nor record a particular presentation data stream, then presentation application 306 stops that particular data stream before the capture step to minimize needless use of presentation workstation 300 resources. In other words, if a particular data stream is neither transmitted nor recorded, presentation application 306 neither captures nor compresses that particular data stream. Conversely, if at some point in time during the presentation the presenter decides to transmit or record a particular presentation data stream that is neither captured nor compressed, presentation application 306 automatically starts to capture and compress that particular presentation data stream so that the operation decided on by the presenter (transmission and/or recordation) may successfully occur.

Figure 4:
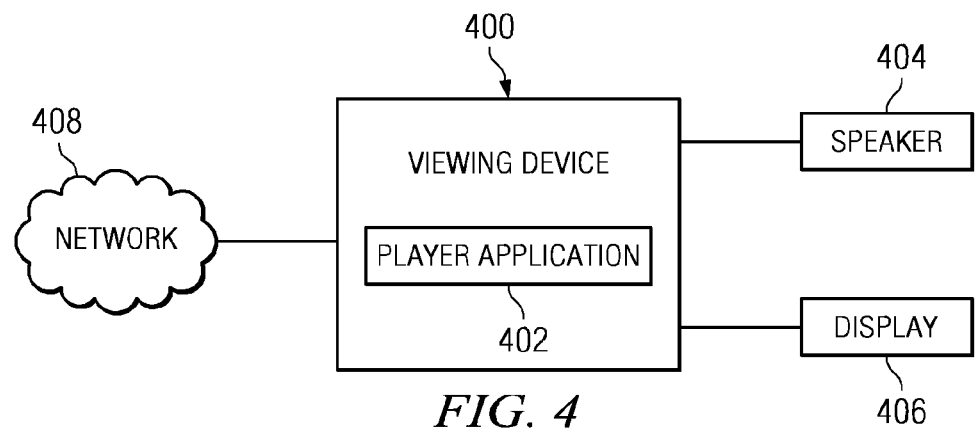
FIG. 4 is a block diagram of components of a viewing device in accordance with an illustrative embodiment.

With reference now to FIG. 4, a block diagram of components of a viewing device is depicted in accordance with an illustrative embodiment. Viewing device 400 may, for example, be viewing device 108 in FIG. 1. Viewing device 400 typically is a computer, such as data processing system 200 in FIG. 2, but also may be a PDA or a cellular telephone.

Viewing device 400 is capable of executing various applications, such as, for example, player application 402. Viewing device 400 utilizes player application 402 to receive, process, and manage one or more presentation data streams from a presentation workstation, such as, for example, presentation workstation 300 in FIG. 3. The output of player application 402 may, for example, be on speaker 404 and/or display 406. Speaker 404 and display 406 connect to viewing device 400. Viewing device 400 uses speaker 404 to output audio presentation data components and display 406 to output video, image, and textual presentation data components.

Viewing device 400 connects to network 408, such as, for example, viewing device 108 connects to network 102 in FIG. 1. To connect with the presentation workstation, viewing device 400 needs an address identifier, such as a URL, for the presentation workstation. The presentation workstation may, for example, transmit this address identifier to viewing device 400 via any convenient means, such as instant message, e-mail, or an entry in a shared calendar, via network 408.

A user, by inserting this presentation address identifier into a run-time execution environment, such as a Web browser, connects viewing device 400 to the presentation workstation to receive the one or more presentation data streams and output them. If player application 402 was not pre-installed or previously downloaded on viewing device 400, the run-time execution environment may download player application 402 from, for example, the presentation workstation or from a server within network 408 and install player application 402 at the beginning of the presentation.

Dynamic installation of player application 402 may occur using known technologies, such as Java™ applets. Once the user starts player application 402, player application 402 uses the presentation address identifier to connect to the presentation workstation, which then initiates a stream of live presentation data from the presentation workstation to viewing device 400. Viewing device 400 receives the one or more presentation data streams from the presentation workstation, decompresses the one or more presentation data streams, and outputs the one or more presentation data streams on an appropriate output device, such as speaker 404 and/or display 406. However, it should be noted that a user or viewer of viewing device 400 may at any time during the presentation select which of the transmitted one or more presentation data streams from the presentation workstation to output on speaker 404 and/or display 406.

A user or viewer that receives a presentation file from the presentation workstation on viewing device 400 may use player application 402 to view the recorded presentation data stream. In addition, player application 402 may present a window to the user during playback of the presentation file, which shows the navigation tags inserted by the presenter and/or automatically inserted by a presentation application, such as presentation application 306 in FIG. 3, during recording of the presentation. By selecting a particular navigation tag, the viewer may start viewing the presentation file at a corresponding navigation tag position. By using the navigation tags, a viewer may decide which portions of the presentation file to review rather than reviewing the entire presentation or performing a random "seek" operation to find a particular spot in the presentation file that the user wants to see and/or hear.

Figure 5B:
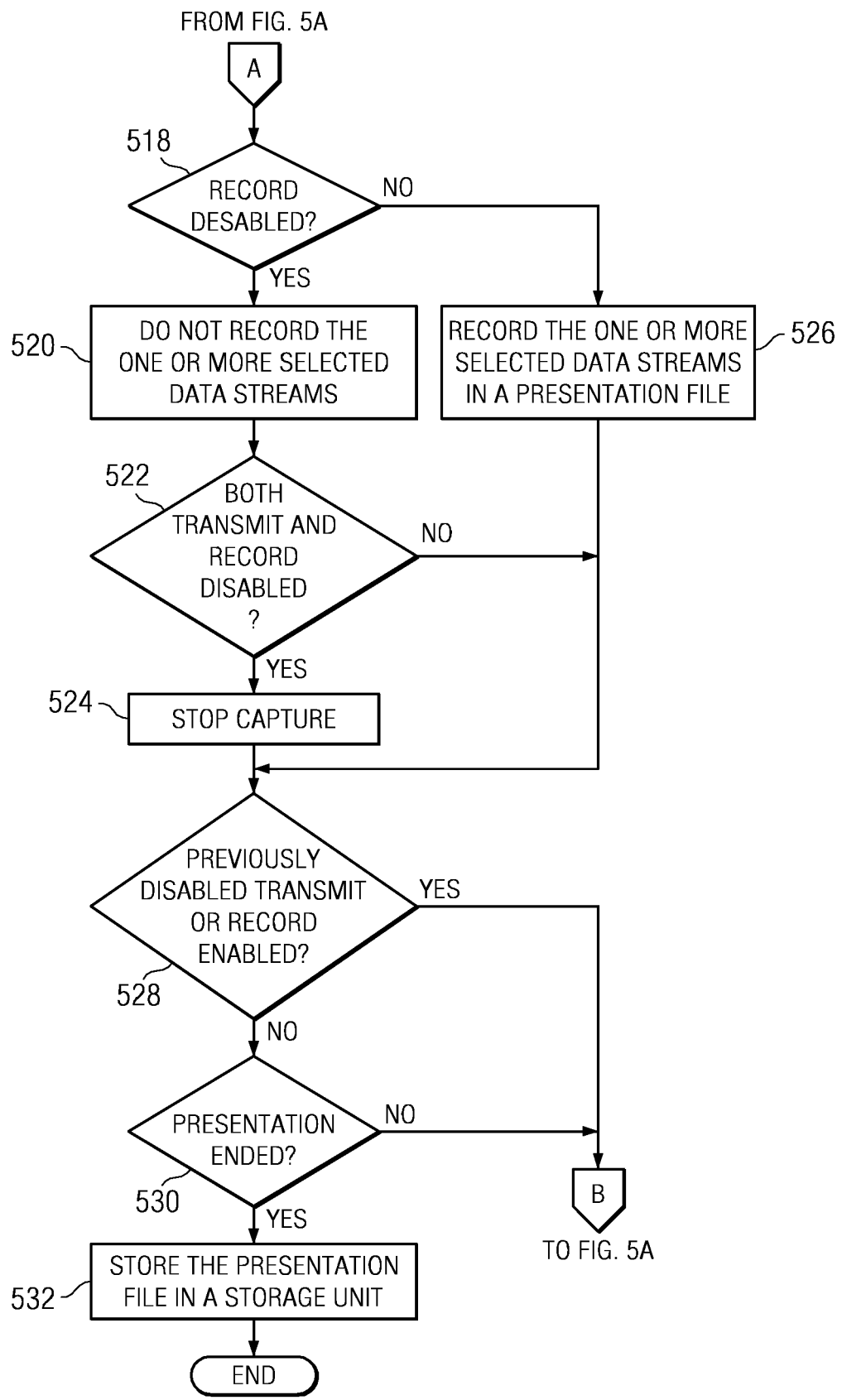

With reference now to FIG. 5A and FIG. 5B, a flowchart illustrating an exemplary process for transmitting and recording synchronized streams of live presentation data by a presentation workstation is shown in accordance with an illustrative embodiment. The exemplary process shown in FIG. 5A and FIG. 5B may be implemented in a presentation application, such as, for example, presentation application 306 in FIG. 3. The presentation application resides in a presentation workstation, such as presentation workstation 104 in FIG. 1.

The process begins when the presentation application receives an input from a user, or presenter, to open the presentation application (step 502). Subsequent to, or concurrent with, opening the presentation application in step 502, the presentation application retrieves operating parameters for the presentation application (step 504). The operating parameters may be default operating parameters or user-inputted operating parameters. The operating parameters may, for example, be whether transmit and record processes are enabled, which presentation data streams components are to be transmitted and/or recorded, which image capture mode is enabled, and which image capture parameters are enabled.

After retrieving the operating parameters in step 504, the presentation application makes a determination as to whether a user started a presentation (step 506). If the user did not start the presentation, no output of step 506, then the process returns to step 506 where the presentation application waits for the presentation to start. If the user did start the presentation, yes output of step 506, then the presentation application captures one or more user selected presentation data streams (step 508).

Subsequent to capturing the one or more user selected presentation data streams in step 508, the presentation application compresses the one or more user selected presentation data streams (step 510). After compressing the one or more user selected presentation data streams in step 510, the presentation application makes a determination as to whether the user disabled the transmit process (step 512). If the user did disable the transmit process, yes output of step 512, then the presentation application does not transmit the one or more user selected presentation data streams (step 514). The process proceeds to step 518 thereafter. If the user did not disable the transmit process, no output of step 512, then the presentation application does transmit the one or more user selected presentation data streams over a network, such as network 102 in FIG. 1, to one or more viewing devices, such as viewing devices 108, 110, and 112 in FIG. 1 (step 516).

Then, the presentation application makes a determination as to whether the user disabled the record process (step 518). If the user did disable the record process, yes output of step 518, then the presentation application does not record the one or more user selected presentation data streams (step 520). Afterward, the presentation application makes a determination as to whether the user disabled both the transmit and record processes (step 522). If the user did disable both the transmit and record processes, yes output of step 522, then the presentation application stops capture of the one or more user selected presentation data streams (step 524). The process proceeds to step 528 thereafter. If the user did not disable both the transmit and record processes, no output of step 522, then the process proceeds to step 528.

Returning now to step 518, if the user did not disable the record process, no output of step 518, then the presentation application does record the one or more user selected presentation data streams (step 526). However, it should be noted that the presentation application may perform steps 518, 520, 522, 524, and 526 subsequent to, or concurrent with, steps 512, 514, and 516. Subsequently, the presentation application makes a determination as to whether the user enabled a previously disabled transmit or record process (step 528).

If the user did enable a previously disabled transmit or record process, yes output of step 528, then the process returns to step 508. If the user did not enable a previously disabled transmit or record process, no output of step 528, then the presentation application makes a determination as to whether the user ended the presentation (step 530). If the user did not end the presentation, no output of step 530, then the process returns to step 508. If the user did end the presentation, yes output of step 530, then the presentation application stores the one or more recorded presentation data streams in a presentation file within a storage unit, such as storage device 314 in FIG. 3. The process terminates thereafter.

Figure 6:
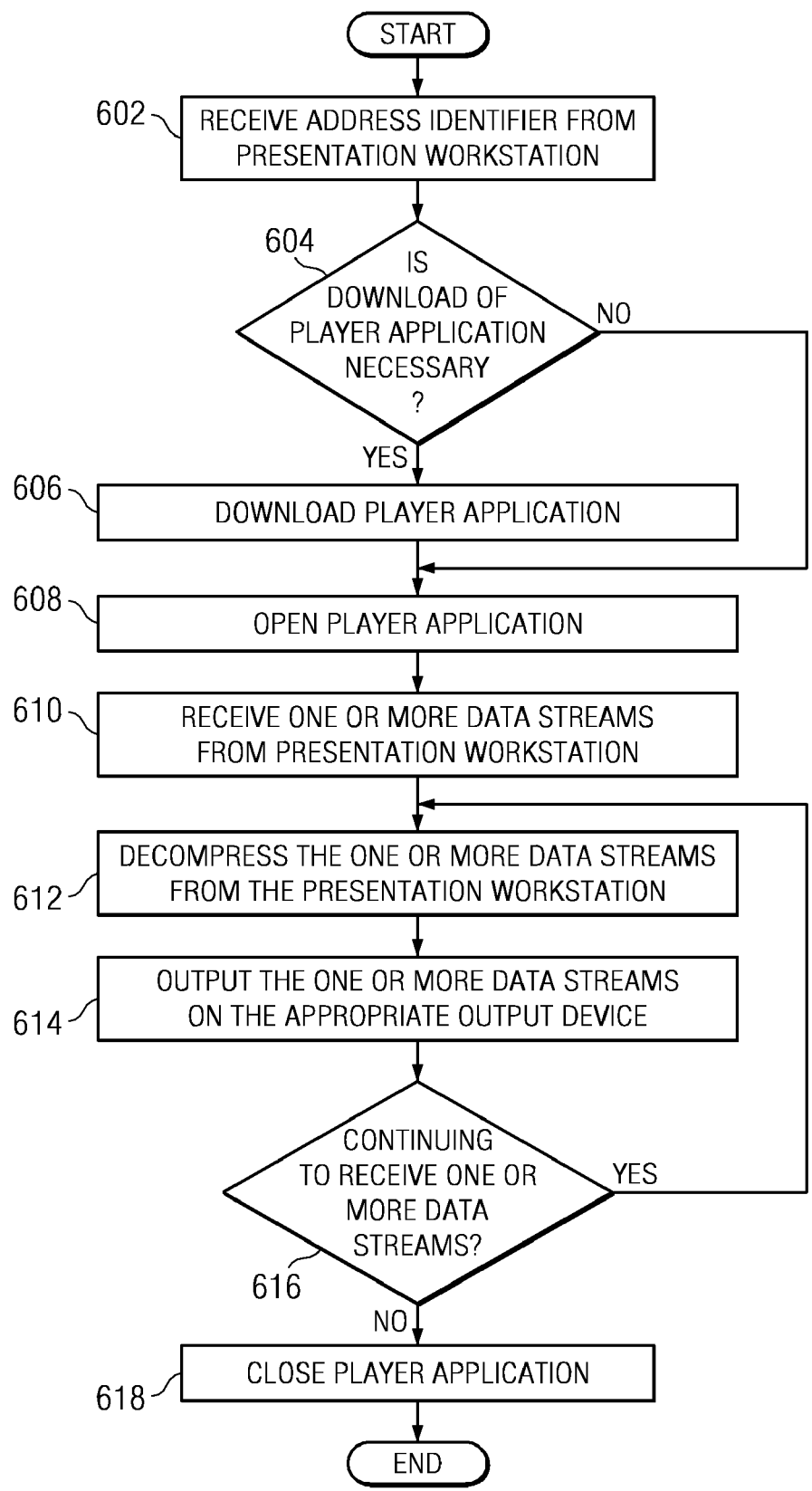
FIG. 6 is a flowchart illustrating an exemplary process for viewing transmitted synchronized streams of presentation data by a viewing device in accordance with an illustrative embodiment.

With reference now to FIG. 6, a flowchart illustrating an exemplary process for viewing transmitted synchronized streams of presentation data by a viewing device is shown in accordance with an illustrative embodiment. The exemplary process shown in FIG. 6 may be implemented in a viewing device, such as, for example, viewing device 400 in FIG. 4.

The process begins when the viewing device receives an address identifier from a presentation workstation, such as presentation workstation 104 in FIG. 1 (step 602). The viewing device may, for example, receive the address identifier from the presentation workstation by instant message or e-mail via a network, such as network 102 in FIG. 1. After receiving the presentation workstation's address identifier in step 602, the viewing device makes a determination as to whether a download of a player application, such as player application 402 in FIG. 4, is necessary (step 604).

If download of the player application is necessary, yes output of step 604, then the viewing device downloads the player application (step 606). The process proceeds to step 608 thereafter. Download of the player application may be necessary because the player application was not pre-installed or previously downloaded into the viewing device. The viewing device may download the player application from, for example, the presentation workstation using the presentation address identifier or from a player source, such as a server, connected to the network.

If download of the player application is not necessary because the player application was pre-installed or previously downloaded into the viewing device, no output of step 604, then the viewing device opens the player application (step 608). The viewing device uses the player application to receive and process one or more presentations data streams from the presentation workstation (step 610). After receiving the one or more presentation data streams from the presentation workstation in step 610, the player application decompresses the one or more presentations data streams (step 612).

Subsequently, the player application outputs the one or more presentation data streams on an appropriate output device, such as, for example, speaker 404 and/or display 406 in FIG. 4 (step 614). Then, the viewing device makes a determination as to whether the player application continues to receive one or more presentation data streams (step 616). If the player application does continue to receive one or more presentation data streams, yes output of step 616, then the process returns to step 612. If the player application does not continue to receive one or more presentation data streams, no output of step 616, then the viewing device closes the player application (step 618). The process terminates thereafter.

Thus, illustrative embodiments provide a computer implemented method, system, and computer usable program code for transmitting and recording synchronized streams of presentation data. The invention may take the form of an entirely hardware embodiment, an entirely software embodiment, or an embodiment containing both hardware and software elements. In a preferred embodiment, the invention is implemented in software, which includes but is not limited to firmware, resident software, microcode, et cetera.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that may contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a ROM, a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, et cetera) may be coupled to the system either directly or through intervening I/O controllers.

Network adapters also may be coupled to the system to enable the data processing system to become coupled to other data processing systems, remote printers, or storage devices through intervening private or public networks. Modems, cable modems, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for transmitting one or more presentation data streams from a presentation workstation, the computer implemented method comprising:
  responsive to receiving an input to open a presentation application, obtaining by the presentation workstation operating parameters for a presentation to provide presentation operating parameters for the presentation;
  capturing by the presentation workstation one or more selected presentation data streams based on the presentation operating parameters for the presentation to form one or more captured presentation data streams;
  transmitting by the presentation workstation the one or more captured presentation data streams based on the presentation operating parameters for the presentation directly from the presentation workstation to one or more viewing devices via a network without utilizing any server connected to the network; and
  responsive to determining by one or more of the one or more viewing devices that download of a player application used to output the one or more captured presentation data streams on an appropriate output device is necessary, downloading by the one or more of the one or more viewing devices the player application directly from the presentation workstation to the one or more of the one or more viewing devices via the network without utilizing any server connected to the network.

2. The computer implemented method of claim 1, further comprising:
  recording the one or more captured presentation data streams based on the presentation operating parameters for the presentation to form one or more recorded presentation data streams.

3. The computer implemented method of claim 2, further comprising:
  storing the one or more recorded presentation data streams in a presentation file within a storage device in the presentation workstation to provide a complete record of the presentation.

4. The computer implemented method of claim 3, further comprising:
  compressing the one or more captured presentation data streams to form one or more compressed presentation data streams, wherein the one or more compressed presentation data streams are transmitted based on the presentation operating parameters for the presentation.

5. The computer implemented method of claim 4, wherein the one or more compressed presentation data streams are recorded based on the presentation operating parameters for the presentation.

6. The computer implemented method of claim 2, wherein the presentation application stops the capturing step for one or more particular presentation data streams when the transmitting and the recording steps for the one or more particular presentation data streams are disabled.

7. The computer implemented method of claim 2, wherein the transmitting and the recording steps may be enabled and disabled independently of each other at the presentation workstation.

8. The computer implemented method of claim 3, wherein one or more of the transmitting, the recording, and the storing steps may be enabled and disabled at the presentation workstation at any time during the presentation based on a user input.

9. The computer implemented method of claim 1, wherein the transmitting step may be enabled and disabled at the presentation workstation for each of the one or more captured presentation data streams independently of other captured presentation data streams.

10. The computer implemented method of claim 1, wherein a selected display content is captured and transmitted, and wherein the selected display content is a current window within a display device in the presentation workstation.

11. The computer implemented method of claim 10, wherein the selected display content is a dynamic animation or video, and wherein the dynamic animation or video is transmitted as a video presentation data stream.

12. The computer implemented method of claim 10, wherein the selected display content is a static image, and wherein the static image is transmitted as an image presentation data stream.

13. The computer implemented method of claim 12, wherein the presentation workstation transmits the image presentation data stream of the static image automatically at pre-determined time intervals.

14. The computer implemented method of claim 2, further comprising:
    inserting navigation tags into the one or more captured presentation data streams at the presentation workstation.

15. The computer implemented method of claim 14, wherein a user inserts the navigation tags into the one or more captured presentation data streams at the presentation workstation.

16. The computer implemented method of claim 1, wherein the presentation application automatically inserts navigation tags into the one or more captured presentation data streams at the presentation workstation.

17. The computer implemented method of claim 1, wherein the presentation application sends a presentation workstation address identifier to the one or more viewing devices via the network for a run-time execution environment on the one or more viewing devices to access the captured presentation data streams.

18. The computer implemented method of claim 15, wherein the user inserts the navigation tags into the one or more captured presentation data streams at the presentation workstation using voice commands via an audio capture device.

19. The computer implemented method of claim 17, wherein the one or more viewing devices connect to the presentation workstation and initiate transmission of the one or more captured presentation data streams using the presentation workstation address identifier.

20. The computer implemented method of claim 17, wherein the run-time execution environment is a Web browser, and wherein the presentation workstation address identifier is a uniform resource locator.

21. The computer implemented method of claim 2, wherein users of the one or more viewing devices select which transmitted or recorded one or more captured presentation data streams to output on the one or more viewing devices.

22. The computer implemented method of claim 14, wherein users of the one or more viewing devices utilize the navigation tags in the one or more captured presentation data streams to navigate through the presentation at the one or more viewing devices.

23. A data processing system for transmitting one or more presentation data streams, comprising:
    a bus system;
    a storage device connected to the bus system, wherein the storage device includes a set of instructions; and
    a processing unit connected to the bus system, wherein the processing unit executes the set of instructions to obtain by a presentation workstation operating parameters for a presentation to provide presentation operating parameters for the presentation in response to receiving an input to open a presentation application, capture by the presentation workstation one or more selected presentation data streams based on the presentation operating parameters for the presentation to form one or more captured presentation data streams, transmit by the presentation workstation the one or more captured presentation data streams based on the presentation operating parameters for the presentation directly from a presentation workstation to one or more viewing devices via a network without utilizing any server connected to the network, and download by one or more of the one or more viewing devices a player application used to output the one or more captured presentation data streams on an appropriate output device directly from the presentation workstation to the one or more of the one or more viewing devices via the network without utilizing any server connected to the network in response to determining by the one or more of the one or more viewing devices that download of the player application is necessary.

24. The data processing system of claim 23, wherein the processing unit executes a further set of instructions to record the one or more captured presentation data streams based on the presentation operating parameters for the presentation to form one or more recorded presentation data streams.

25. The data processing system of claim 24, wherein the processing unit executes a further set of instructions to store the one or more recorded presentation data streams in a presentation file within a storage device in the presentation workstation to provide a complete record of the presentation.

26. A computer program product for transmitting one or more presentation data streams from a presentation workstation, the computer program product comprising:
    a non-transitory computer usable medium having computer usable program code embodied therein, the non-transitory computer usable medium comprising:
        computer usable program code configured to obtain by the presentation workstation operating parameters for a presentation to provide presentation operating parameters for the presentation in response to receiving an input to open a presentation application;
        computer usable program code configured to capture by the presentation workstation one or more selected presentation data streams based on the presentation operating parameters for the presentation to form one or more captured presentation data streams;
        computer usable program code configured to transmit by the presentation workstation the one or more captured presentation data streams based on the presentation operating parameters for the presentation directly from the presentation workstation to one or more viewing devices via a network without utilizing any server connected to the network; and computer usable program code configured to download by one or more of the one or more viewing devices a player application used to output the one or more captured presentation data streams on an appropriate output device directly from the presentation workstation to the one or more of the one or more viewing devices via the network without utilizing any server connected to the network in response to determining by the one or more of the one or more viewing devices that download of the player application is necessary.

27. The computer program product of claim 26, further comprising:

computer usable program code configured to record the one or more captured presentation data streams based on the presentation operating parameters for the presentation to form one or more recorded presentation data streams.

28. The computer program product of claim 27, further comprising:

computer usable program code configured to store the one or more recorded presentation data streams in a presentation file within a storage device in the presentation workstation to provide a complete record of the presentation.

29. A computer implemented method for receiving one or more presentation data streams from a presentation workstation, the computer implemented method comprising:

responsive to receiving by a viewing device an address identifier from a presentation workstation via a network, receiving by the viewing device one or more presentation data streams for a presentation directly from the presentation workstation via the network using the address identifier for the presentation workstation without utilizing any server connected to the network, wherein a player application used to output the one or more presentation data streams on an appropriate output device is downloaded by the viewing device directly from the presentation workstation using the address identifier of the presentation workstation without utilizing any server connected to the network; and outputting by the viewing device the one or more presentation data streams for the presentation on the appropriate output device.

30. The computer implemented method of claim 29, wherein received presentation data streams comprise compressed presentation data streams, and further comprising:

decompressing the compressed presentation data streams.

31. The computer implemented method of claim 30, wherein the receiving, the outputting, and the decompressing steps are performed in the viewing device.

32. The computer implemented method of claim 29, wherein the viewing device receiving the one or more recorded presentation data streams for a presentation directly from the presentation workstation via the network is one of a personal digital assistant or a cellular telephone.

33. The computer implemented method of claim 29, wherein the address identifier of the presentation workstation is sent from the presentation workstation to the viewing device via an entry in a shared calendar.

34. The computer implemented method of claim 29, wherein a user may select which of the one or more presentation data streams to output during the presentation.

* * * * *